(12) United States Patent
Chen

(10) Patent No.: US 7,841,870 B2
(45) Date of Patent: Nov. 30, 2010

(54) ELECTRONIC DEVICE AND ASSEMBLING METHOD THEREOF

(75) Inventor: Shun-Bin Chen, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 0 days.

(21) Appl. No.: 12/567,790

(22) Filed: Sep. 27, 2009

(65) Prior Publication Data
US 2010/0261358 A1 Oct. 14, 2010

(30) Foreign Application Priority Data
Apr. 8, 2009 (TW) .............................. 98111699 A

(51) Int. Cl.
*H01R 12/00* (2006.01)
(52) U.S. Cl. ............................ 439/76.1; 439/65; 439/67
(58) Field of Classification Search .................. 439/67, 439/65, 76.1
See application file for complete search history.

(56) References Cited

U.S. PATENT DOCUMENTS

| | | | |
|---|---|---|---|
| 3,660,728 A * | 5/1972 | Carter | ......................... 361/789 |
| 5,362,243 A * | 11/1994 | Huss et al. | .................. 439/76.1 |
| 5,735,696 A | 4/1998 | Niitsu et al. | |
| 6,293,805 B1 | 9/2001 | Wu | |

* cited by examiner

*Primary Examiner*—Tho D Ta
(74) *Attorney, Agent, or Firm*—Jiang Chyun IP Office

(57) ABSTRACT

An electronic device and an assembling method thereof are provided. The electronic device includes a first electronic module, a second electronic module, and a through connection element. The first electronic module includes a plurality of electronic units, a plurality of lead wires, a daughterboard, and a first connector. The first connector is disposed on the daughterboard. The lead wires are separately connected between the electronic units and the daughterboard. The daughterboard is electrically connected between the lead wires and the first connector. The second electronic module includes a motherboard and a second connector, wherein the second connector disposed on the motherboard is electrically connected with the motherboard. The through connection element being assembled between the first and the second connectors is electrically connected to the first and the second connectors to connect the first electronic module with the second electronic module.

6 Claims, 7 Drawing Sheets

ELECTRONIC DEVICE AND ASSEMBLING METHOD THEREOF

CROSS-REFERENCE TO RELATED APPLICATION

This application claims the priority benefit of Taiwan application serial no. 98111699, filed on Apr. 8, 2009. The entirety of the above-mentioned patent application is hereby incorporated by reference herein and made a part of this specification.

BACKGROUND OF THE INVENTION

1. Field of the Invention

The present invention relates to an electronic device. More particularly, the present invention relates to an electronic device and an assembling method thereof.

2. Description of Related Art

Since a notebook computer has advantages of small size, light weight, easy carry, etc, it is popular to computer consumers. Therefore, many computer manufacturers transfer production focus onto the notebook computers. During a fabrication process of the notebook computer, workers are required to assemble a plurality of components, so that the components can function as an integration. Therefore, whether the assembling process is fluent or not can influence a production efficiency.

Generally, a plurality of electronic units is disposed at an inner side of a palm rest of the notebook computer. When the worker assembles the palm rest, the worker need to connect the electronic units to a main board through lead wires one by one, which is time-consuming and labor-consuming. Moreover, during the assembling process, a casing or the palm rest can shield the components such as the main board, the electronic units and the lead wires, etc, so that the worker is not easy to observe positions of the components. Therefore, the worker has to connect the lead wires to the main board through a touch method. Such a visual blind spot is inconvenient for the worker, which may also decrease an assembling efficiency, or even cause a damage of the components.

SUMMARY OF THE INVENTION

The present invention is directed to an electronic device, which can facilitate a user performing assembling.

The present invention is directed to an assembling method of an electronic device, which can be used to improve an efficiency and convenience for a user assembling the electronic device.

The present invention provides an electronic device including a first electronic module, a second electronic module, and a through connection element. The first electronic module includes a plurality of electronic units, a plurality of lead wires, a daughterboard, and a first connector. The first connector is disposed on the daughterboard. The lead wires are separately connected between the electronic units and the daughterboard. The daughterboard is electrically connected between the lead wires and the first connector. The second electronic module includes a motherboard and a second connector, wherein the second connector is disposed on the motherboard, and is electrically connected to the motherboard. The through connection element is assembled between the first and the second connectors, and is electrically connected to the first and the second connectors, so as to connect the first electronic module to the second electronic module.

In an embodiment of the present invention, the through connection element includes a flexible connection element, a third connector and a fourth connector. The flexible connection element is electrically connected between the third connector and the fourth connector, and the third connector and the fourth connector are used to be respectively assembled to the first connector and the second connector.

In the present invention, the first connector and the second connector respectively face to a first direction, and the third connector and the fourth connector are respectively assembled to the first connector and the second connector along a second direction. The first direction is opposite to the second direction.

In an embodiment of the present invention, the motherboard has a first opening located on an assembling path of the first connector and the third connector.

In an embodiment of the present invention, the first connector and the third connector are located at a side of the motherboard.

In an embodiment of the present invention, the electronic device further includes a first casing and a second casing. The first electronic module is disposed on the first casing, and the second electronic module is disposed on the second casing. The first electronic module and the second electronic module are located between the first casing and the second casing.

In an embodiment of the present invention, the electronic device further includes a cover, and the second casing has a second opening exposing the through connection element. The cover is assembled to the second casing for covering the second opening.

The present invention provides another electronic device including a first electronic module, a second electronic module and a through connection element. The first electronic module includes a plurality of electronic units and a first connector, wherein the electronic units are integrally connected to the first connector. The second electronic module includes a motherboard and a second connector. The second connector is electrically connected to the motherboard. The through connection element includes a flexible connection element, a third connector and a fourth connector. The flexible connection element is electrically connected between the third connector and the fourth connector, and the third connector and the fourth connector are used to be respectively assembled to the first connector and the second connector.

In an embodiment of the present invention, the first electronic module further includes a daughterboard and a plurality of lead wires. The daughterboard is electrically connected to the first connector, and the daughterboard is electrically connected to the electronic units through the lead wires.

In an embodiment of the present invention, the first connector and the second connector respectively face to a first direction, and the third connector and the fourth connector are respectively assembled to the first connector and the second connector along a second direction. The first direction is opposite to the second direction.

In an embodiment of the present invention, the motherboard has a first opening located on an assembling path of the first connector and the third connector.

In an embodiment of the present invention, the first connector and the third connector are located at a side of the motherboard.

In an embodiment of the present invention, the electronic device further includes a first casing and a second casing. The first electronic module is disposed on the first casing, and the second electronic module is disposed on the second casing. The first electronic module and the second electronic module are located between the first casing and the second casing.

In an embodiment of the present invention, the electronic device further includes a cover, and the second casing has a second opening exposing the through connection element. The cover is assembled to the second casing for covering the second opening.

The present invention provides another electronic device including a first casing, a second casing, a first electronic module, a second electronic module, a through connection element and a cover. The second casing has a second opening. The first electronic module is disposed on the first casing and is located between the first casing and the second casing. The first electronic module includes a plurality of electronic units and a first connector. The electronic units are integrally connected to the first connector. The second electronic module is disposed on the second casing and is located between the first casing and the second casing. The second electronic module includes a motherboard and a second connector. The second connector is electrically connected to the motherboard. The through connection element is exposed by the second opening, and is assembled between the first connector and the second connector. The through connection element is electrically connected to the fist connector and the second connector for connecting the first electronic module to the second electronic module. The cover is assembled to the second casing to cover the second opening.

In an embodiment of the present invention, the through connection element includes a flexible connection element, a third connector and a fourth connector. The flexible connection element is electrically connected between the third connector and the fourth connector, and the third connector and the fourth connector are respectively assembled to the first connector and the second connector.

In the present invention, the first connector and the second connector respectively face to a first direction, and the third connector and the fourth connector are respectively assembled to the first connector and the second connector along a second direction. The first direction is opposite to the second direction.

In an embodiment of the present invention, the motherboard has a first opening located on an assembling path of the first connector and the third connector.

In an embodiment of the present invention, the first connector and the third connector are located at a side of the motherboard.

In an embodiment of the present invention, the first electronic module further includes a daughterboard and a plurality of lead wires. The daughterboard is electrically connected to the first connector, and the daughterboard is electrically connected to the electronic units through the lead wires.

According to the above descriptions, in the electronic device and the assembling method thereof, the first electronic module is first used to integrate a plurality of the electronic units and the lead wires, and then the first electronic module is connected to the second electronic module of the electronic device via the through connection element. Therefore, the time and labor cost for assembling the electronic device are saved, and meanwhile during the assembling process, the components can all be operated in sight, which can reduce an assembling error and a chance of damaging the components during the assembling process.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
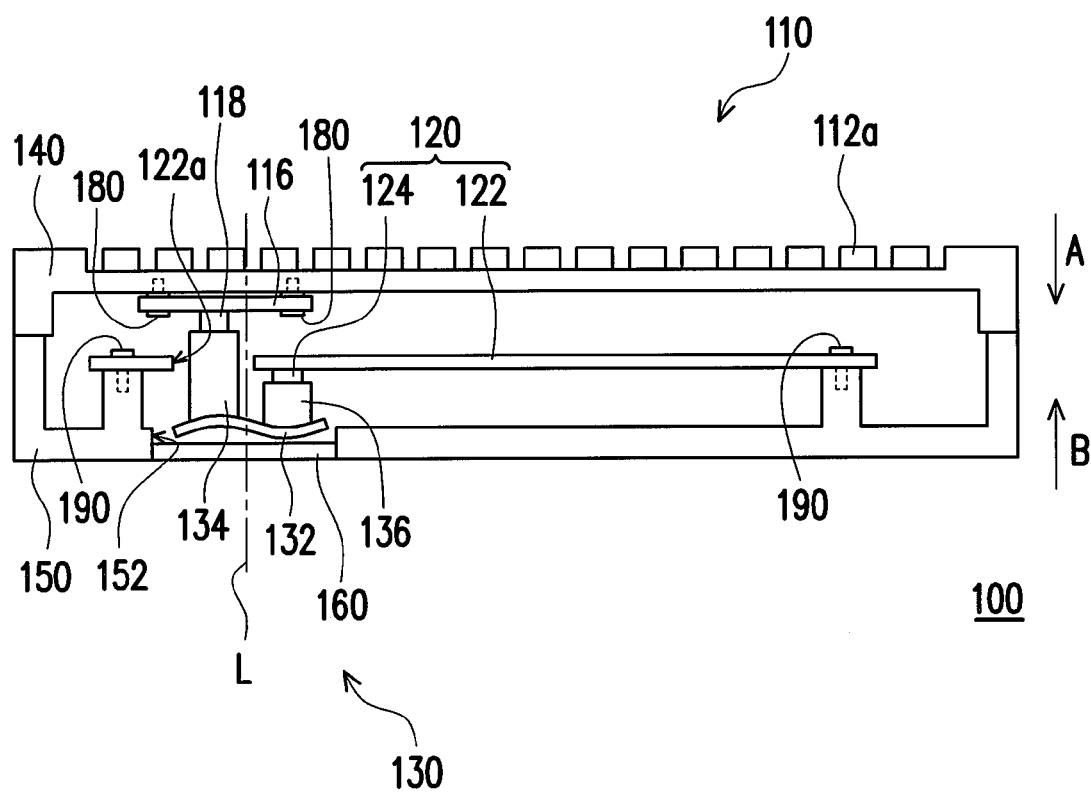
FIG. 1 is a cross-sectional view of an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
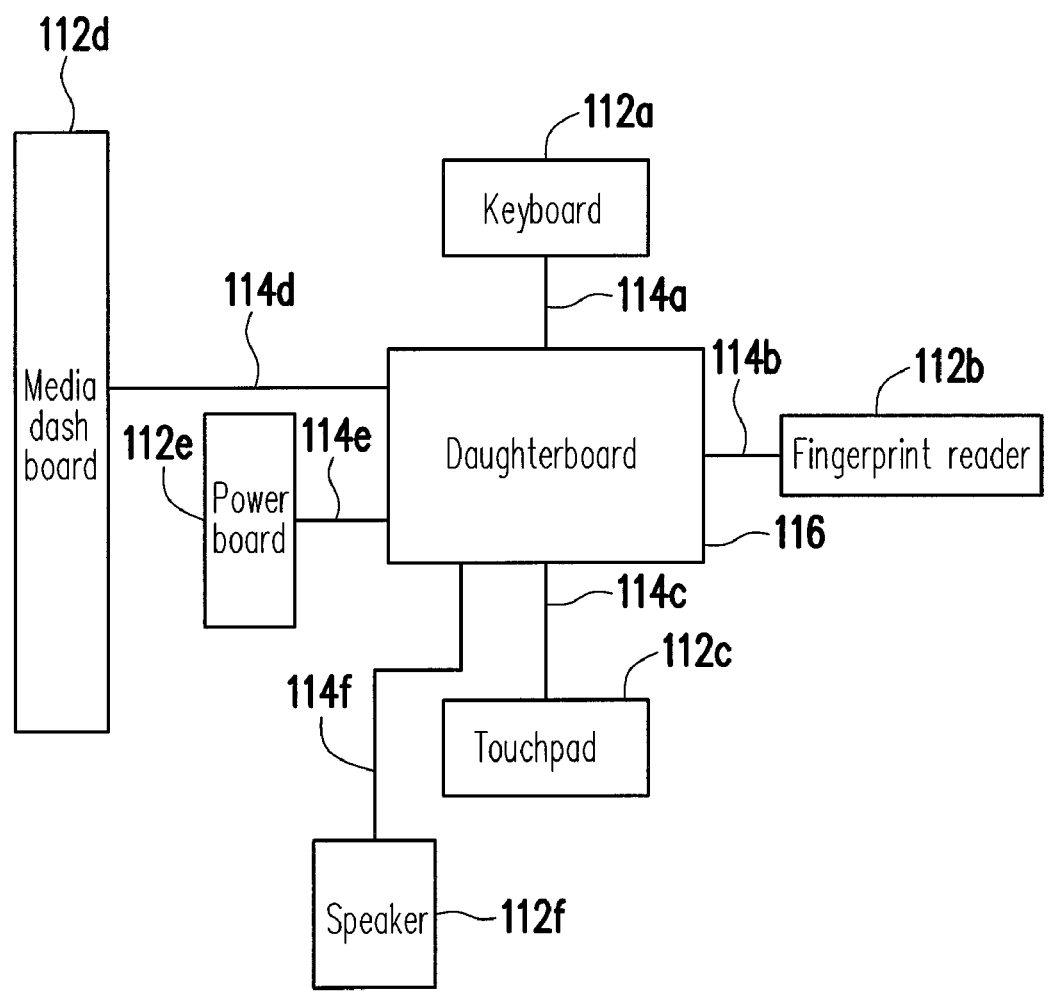
FIG. 2A is a connection block diagram of a first electronic module in an electronic device of FIG. 1.

FIG. 1 is a cross-sectional view of an electronic device according to an embodiment of the present invention. FIG. 2A is a connection block diagram of a first electronic module in the electronic device of FIG. 1. Referring to FIG. 1 and FIG. 2A, the electronic device 100 is for example, a notebook computer including a first electronic module 110, a second electronic module 120 and a through connection element 130. The first electronic module 110 includes a plurality of electronic units 112a, 112b, 112c, 112d, 112e and 112f, a plurality of lead wires 114a, 114b, 114c, 114d, 114e and 114f, a daughterboard 116 and a first connector 118. The first connector 118 is disposed on a lower surface C of the daughterboard 116. The lead wires 114a-114f are respectively connected between the electronic units 112a-112f and the daughterboard 116, and the daughterboard 116 collects signals transmitted through the lead wires 114a-114f, and transmits the signals to the first connector 118.

Figure 2B:
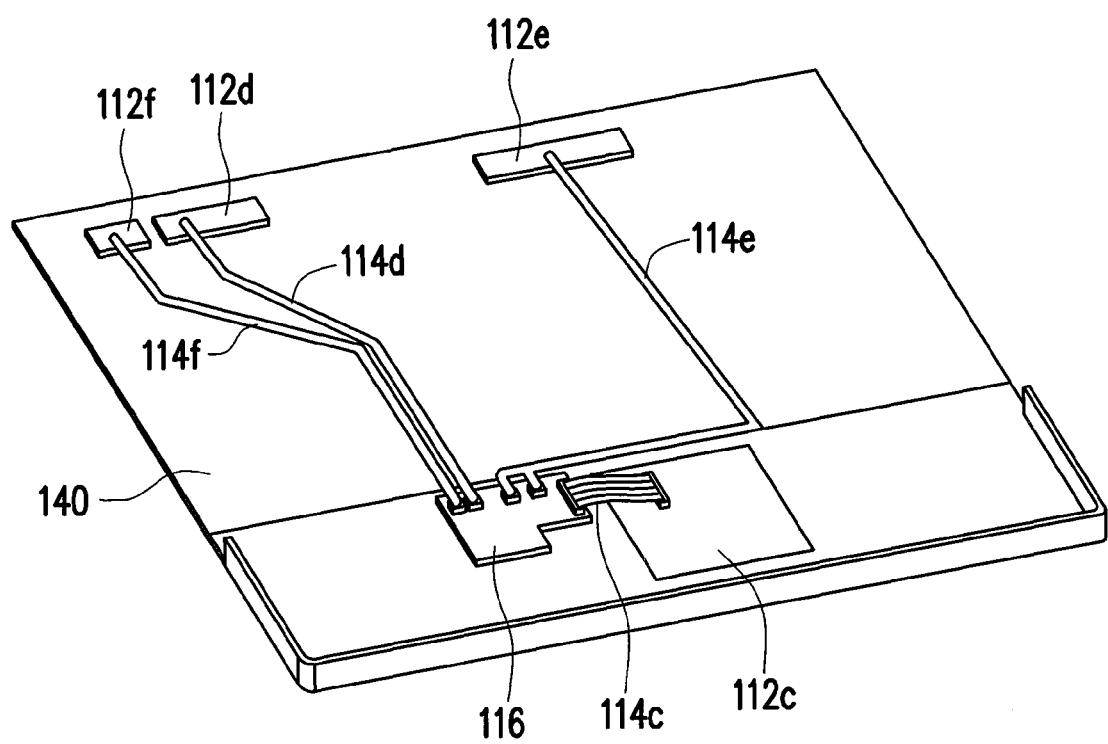
FIG. 2B is a schematic diagram illustrating configurations of a part of electronic units of FIG. 2A.

Further, FIG. 2B is a schematic diagram illustrating configurations of a part of the electronic units of FIG. 2A, wherein a disposing direction of a first casing 140 is inversed to the first casing 140 shown in FIG. 1, i.e. the first casing 140 is disposed upside down to show the components (for example, the daughterboard 116, the electronic unit 112f and the lead wire 114f, etc.) installed on a lower surface thereof. Referring to FIG. 2A and FIG. 2B, wherein only a part of the electronic units is illustrated in FIG. 2B for description, though the present invention is not limited thereto. In the present embodiment, the electronic units 112a-112f are, for example, respectively a keyboard 112a, a fingerprint reader 112b, a touchpad 112c, a media dash board 112d, a power board 112e and a speaker 112f. The electronic units 112a-112f are electrically connected to the daughterboard 116 through the corresponding lead wires 114a-114f, respectively. Certainly, though the electronic units 112a-112f are embodied by the above-described components, types of the electronic units 112a-112f are not limited by the present invention, and a designer can modify the types of the electronic units 112a-112f according to actual demands.

The second electronic module 120 includes a motherboard 122 and a second connector 124. The second connector 124 is disposed on a lower surface C of the motherboard 122, and is electrically connected to the motherboard 122. In the present embodiment, the motherboard 122 is, for example, configured with a central processing unit (CPU) (not shown) a memory (not shown), a south bridge chipset (not shown) and a north bridge chipset (not shown), etc. Moreover, the through connection element 130 is assembled between the first connector 118 and the second connector 124, and is electrically connected to the first connector 118 and the second connector 124 for connecting the first electronic module 110 to the second electronic module 120.

Further, the electronic device 100 can further include the first casing 140 and a second casing 150. In the present embodiment, the first electronic module 110 can be fixed to the first casing 140 through a plurality of fixing elements 180 (for example, screws). Similarly, the second electronic module 120 can be fixed to the second casing 150 through a plurality of fixing elements 190. After the first casing 140 is assembled to the second casing 150, the first electronic module 110 and the second electronic module 120 are located between the first casing 140 and the second casing 150. Moreover, in the present embodiment, the first casing 140 is, for example, a palm rest of the notebook computer.

It should be noticed that since the electronic units 112a-112f are integrally connected to the daughterboard 116 through the lead wires 114a-114f, and the through connection element 130 is connected between the daughterboard 116 and the motherboard 122, the electronic units 112a-112f can be electrically connected to the motherboard 122 through the through connection element 130. Therefore, when the electronic device 100 is assembled, the electronic units 112a-112f are unnecessary to be assembled to the motherboard 122 through the lead wires 114a-114f one by one, so that an assembling efficiency is improved, which may not only reduce a time and labor cost, but may also effectively reduce an assembling cost.

Further, referring to FIG. 1 again, the through connection element 130 includes a flexible connection element 132, a third connector 134 and a fourth connector 136. The flexible connection element 132 is electrically connected between the third connector 134 and the fourth connector 136, and the third connector 134 and the fourth connector 136 are respectively assembled to the first connector 118 and the second connector 124. In the present embodiment, the flexible connection element 132 is, for example, a flex cable or a flex printed circuit board (FPCB). The flexible connection element 132 can absorb an assembling tolerance between the first electronic module 110 and the second electronic module 120 due to its flexibility. Namely, the flexible connection element 132 can not only be used as a connection medium between the first electronic module 110 and the second electronic module 120, but can also facilitate the assembling.

On the other hand, the connectors 118, 124, 134, and 136 are, for example, board to board (BTB) connectors, so that different circuit boards can be electrically connected through the connectors to implement signal transmission. The BTB connectors have been widely used in the art, and the U.S. Pat. No. 6,293,805 or U.S. Pat. No. 5,735,696 can be referred for related structures and descriptions of the BTB connectors, though the present invention is not limited thereto.

Moreover, after the first casing 140 is assembled to the second casing 150, the first connector 118 and the second connector 124 respectively face to a first direction A. Now, the third connector 134 and the fourth connector 136 can be respectively assembled to the first connector 118 and the second connector 124 along a second direction B opposite to the first direction A, so as to connect the first electronic module 110 and the second electronic module 120.

Further, the motherboard 122 has a first opening 122a located on an assembling path L of the first connector 118 and the third connector 134. When the first casing 140 is assembled to the second casing 150, at least a part of the first connector 118 penetrates through the first opening 122a. Moreover, the second casing 150 has a second opening 152 exposing the through connection element 130. The through connection element 130 can be connected to the first connector 118 and the second connector 124 through the second opening 152. In other words, a design size of the second opening 152 preferably at least facilitate the through connection element 130 being connected to the first connector 118 and the second connector 124 from external. Certainly, the second opening 152 can also be formed along with openings required by other devices or an operation demand, so as to avoid forming excessive openings. Moreover, the electronic device 100 can further include a cover 160. After the assembling of the aforementioned components is completed, the cover 160 can be assembled to the second opening 152 to cover the second opening 152, so as to protect the first and the second electronic modules 110 and 120 within the first and the second casings 140 and 150.

Figure 3:
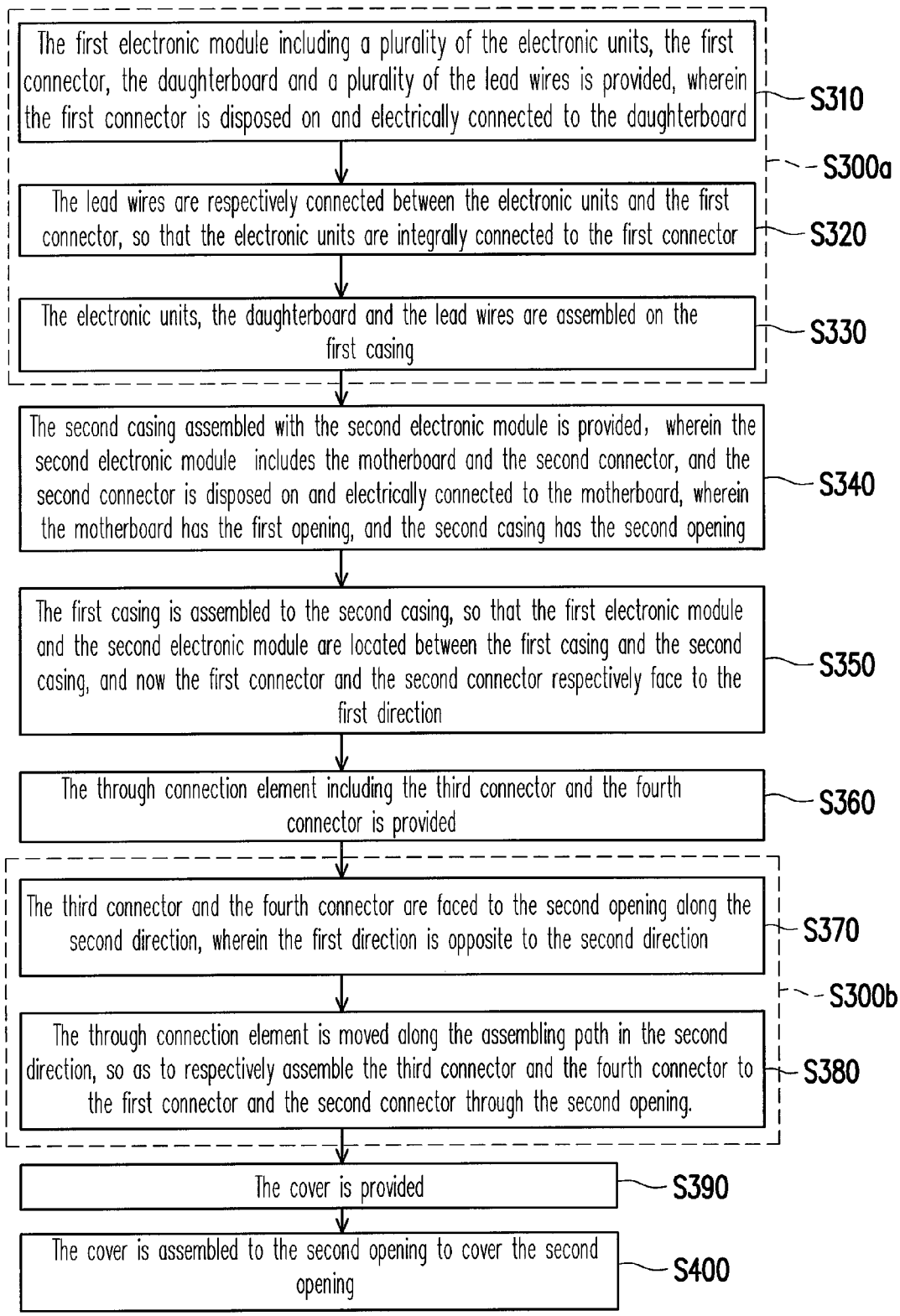
FIG. 3 is a flowchart illustrating an assembling method of an electronic device of FIG. 1.

FIG. 3 is a flowchart illustrating an assembling method of the electronic device of FIG. 1, and FIGS. 4-6 are cross-sectional views of an assembling flow of FIG. 3 corresponding to the electronic device of FIG. 1. The assembling flow is described below with reference of FIGS. 3-6. Moreover, since the structure of the electronic device 100 has been described above, detailed description thereof is not repeated.

Figure 4:
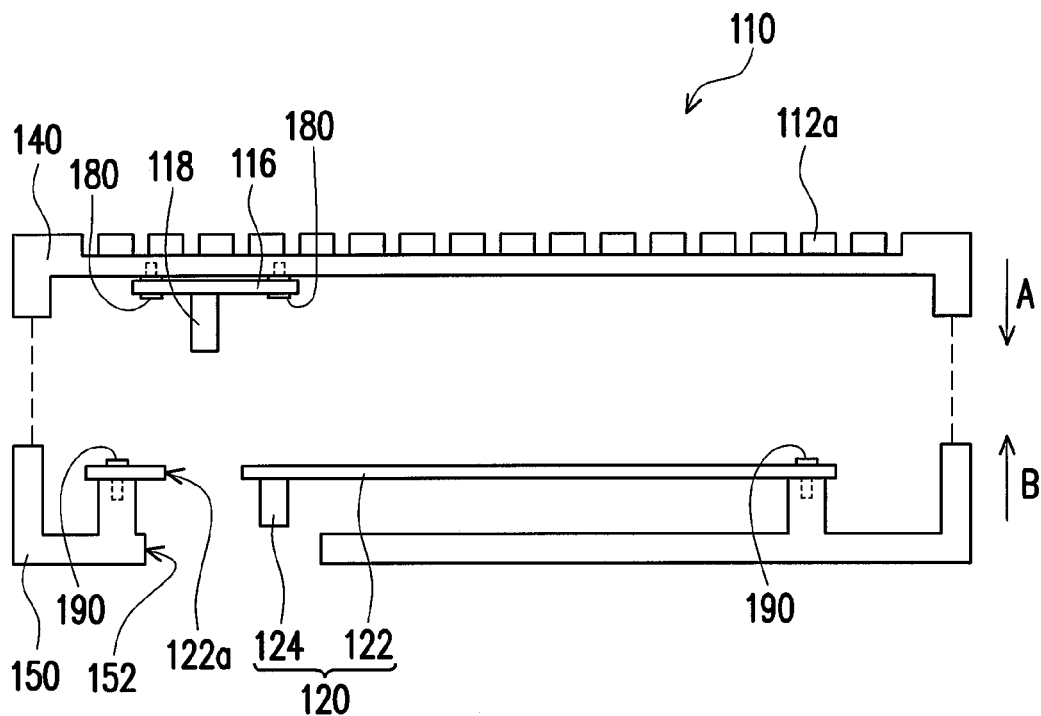
FIGS. 4-6 are cross-sectional views of an assembling flow of FIG. 3 corresponding to an electronic device of FIG. 1.

Referring to FIG. 3 and FIG. 4, first, in step S300a, the first casing 140 assembled with the first electronic module 110 is provided. In detail, the step S300a includes three sub-steps S310-S330. First, in the step S310, the first electronic module 110 including a plurality of the electronic units 112a-112f, the first connector 118, the daughterboard 116 and a plurality of the lead wires 114a-114f is provided, wherein the first connector 118 is disposed on and electrically connected to the daughterboard 116. Next, in the step S320, the lead wires 114a-114f are respectively connected between the electronic units 112a-112f and the first connector 118, so that the electronic units 112a-112f are integrally connected to the first connector 118 (shown as FIG. 2A or FIG. 2B). Next, in the step S330, the electronic units 112a-112f, the daughterboard 116 and the lead wires 114a-114f are assembled on the first casing 140.

Next, in step S340, the second casing 150 assembled with the second electronic module 120 is provided. The second electronic module 120 includes the motherboard 122 and the second connector 124, wherein the second connector 124 is disposed on and electrically connected to the motherboard 122. The motherboard 122 has the first opening 122a, and the second casing 150 has the second opening 152.

Figure 5:
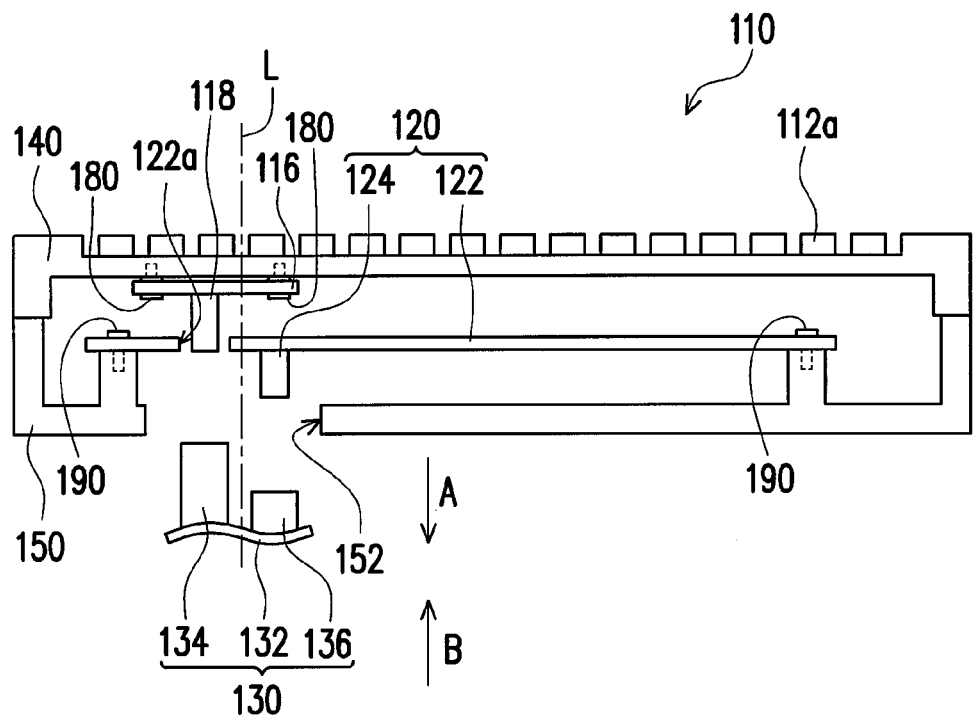

Next, referring to FIG. 4 and FIG. 5, a step S350 is executed, by which the first casing 140 is assembled to the second casing 150 along the first direction A, so that the first electronic module 110 and the second electronic module 120 are located between the first casing 140 and the second casing 150. Now, the first connector 118 and the second connector 124 respectively face to the first direction, and the first opening 122a exposes the first connector 118.

Next, in step S360, the through connection element 130 including the third connector 134, the fourth connector 136 and the flexible connection element 132 is provided.

Figure 6:
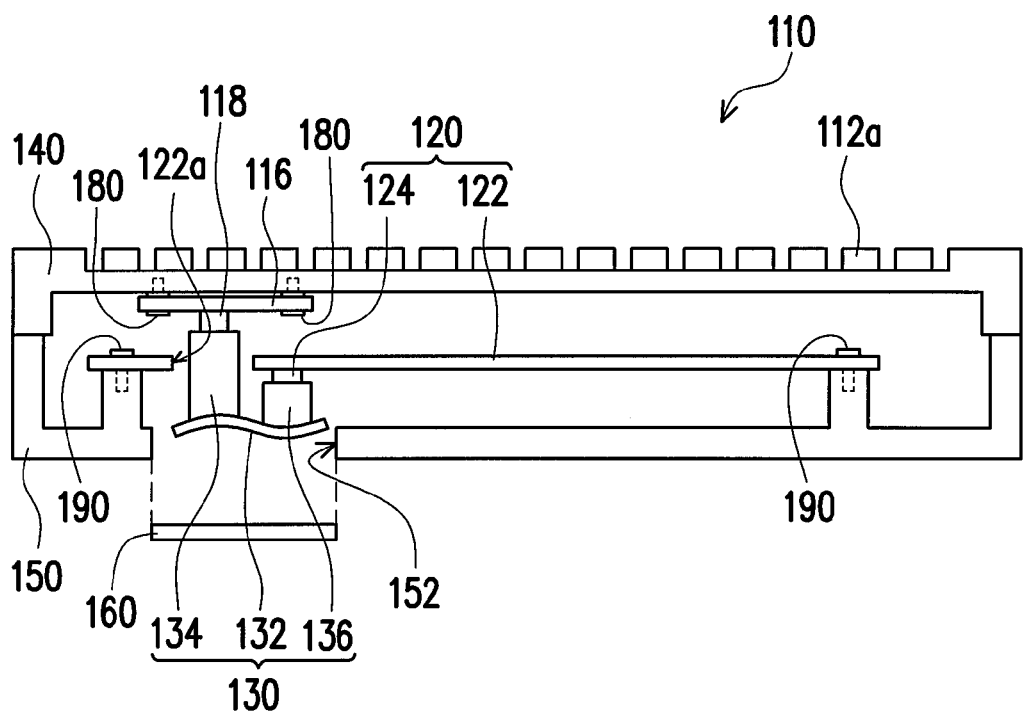

Next, referring to FIG. 5 and FIG. 6, in step S300b, the through connection element 130 is assembled to the first connector 118 and the second connector 124. In detail, the step S300b includes two sub-steps S370 and 5380. First, in the step S370, the third connector 134 and the fourth connector 136 are faced to the second opening 152 along the second direction B. Next, in the step S380, the through connection element 130 is moved along the assembling path L in the second direction B. By such means, the through connection element 130 can be assembled between the first electronic module 110 and the second electronic module 120 through the second opening 152, so that the third connector 134 and the fourth connector 136 are respectively assembled to the first connector 118 and the second connector 124.

It should be noticed that since the through connection element 130 can be assembled to the first connector 118 and the second connector 124 through the second opening 152 after the first casing 140 is assembled to the second casing 150, positions of the first connector 118 and the second connector 124 can be observed by the user through the second opening 152, so as to conveniently assemble the through connection element 130. Moreover, as described above, though the second opening 152 is only used to assemble the through connection element 130, in another embodiment that is not shown, a size of the second opening 152 can be enlarged to facilitate replacing the memory or the CPU on the motherboard 126. Namely, the second opening 152 and an original opening (not shown) on the second casing 150 can be integrated to reduce a number of the openings.

Moreover, after the through connection element 130 is assembled, steps S390 and S400 are executed, by which the cover 160 is provided, and is assembled to the second opening 152. By such means, the cover 160 can cover the second opening 152. Now, the assembling process of the electronic device 100 is completed.

Figure 7:
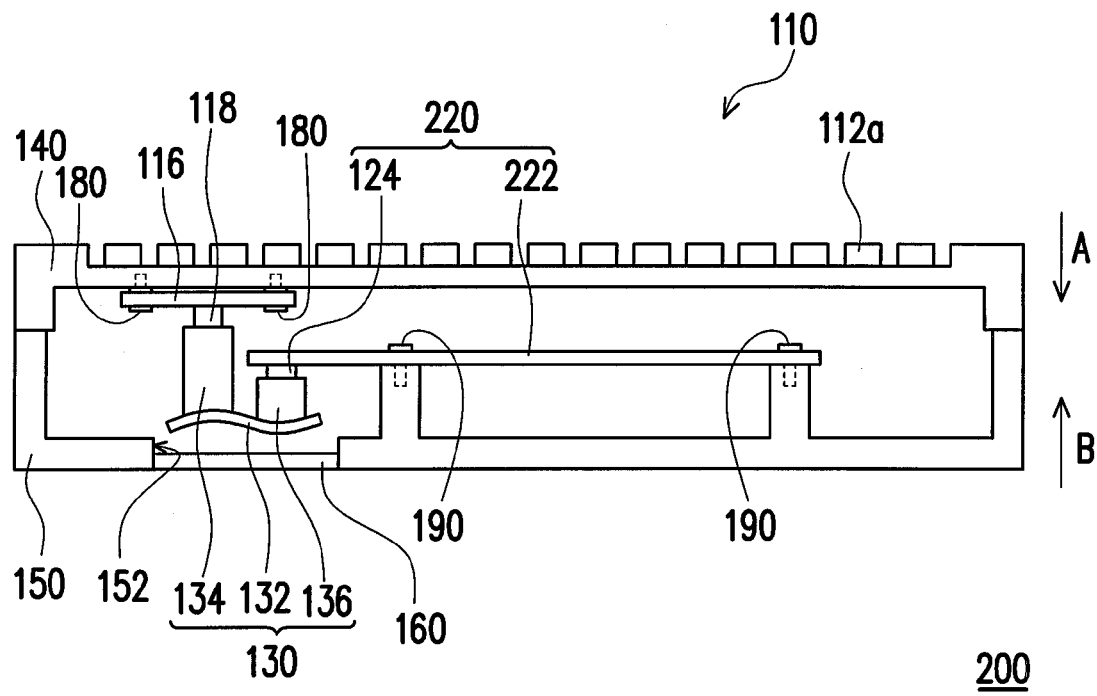
FIG. 7 is a cross-sectional view of an electronic device according to another embodiment of the present invention.

FIG. 7 is a cross-sectional view of an electronic device according to another embodiment of the present invention. Referring to FIG. 1 and FIG. 7, in the electronic device 100 of FIG. 1, the first opening 122a exposes the first connector 118, though in the electronic device 200 of the present embodiment, a motherboard 222 of a second electronic module 220 does not has the first opening 122a of FIG. 1, and the first connector 118 and the third connector 134 are located at a side of the motherboard 222. Namely, in the electronic device 200, the first opening 122a of FIG. 1 can be omitted.

Figure 8:
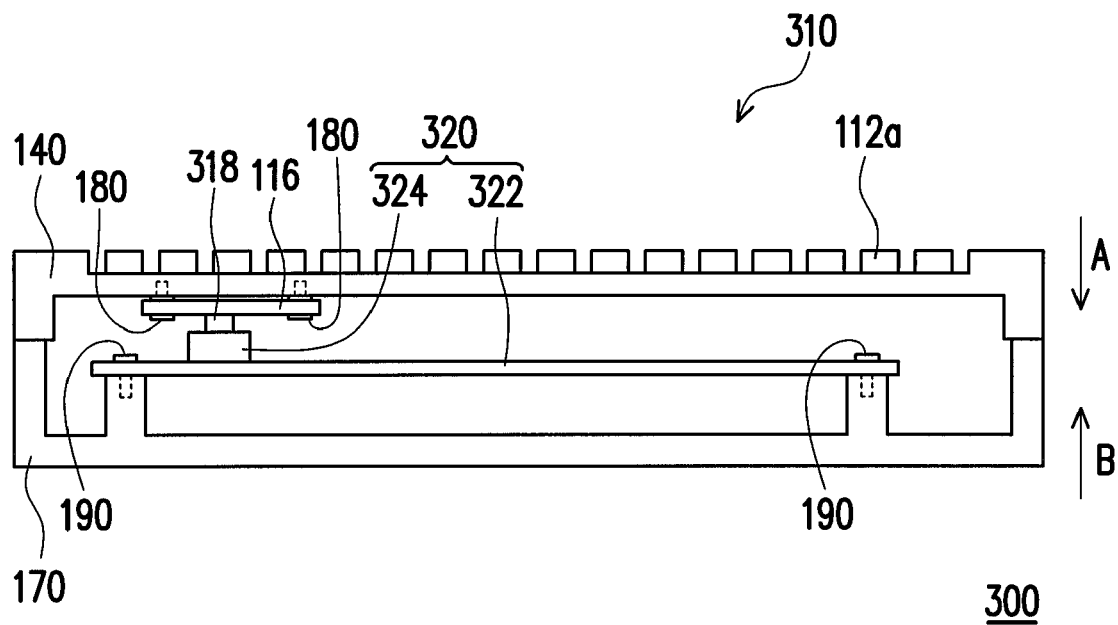
FIG. 8 is a cross-sectional view of an electronic device according to still another embodiment of the present invention.

FIG. 8 is a cross-sectional view of an electronic device according to still another embodiment of the present invention. Referring to FIG. 1 and FIG. 8, in the present embodiment, a fist connector 318 of the electronic device 300 can be directly connected to a second connector 324 to omit the through connection element 130 of FIG. 1 and the first opening 122a and the cover 160 on a second casing 170. In detail, compared to the first embodiment, the second connector 324 disposed on a motherboard 322 of the present embodiment faces to the second direction B, and the second connector 324 and the first connector 318 are respectively a plug or a socket for each other. Therefore, by directly connecting the first connector 318 to the second connector 324, a first electronic module 310 can be electrically connected to a second electronic module 320.

In summary, according to the electronic device an the assembling method thereof of the present invention, by integrating a plurality of the electronic units and the lead wires on the first electronic module, and connecting the first electronic module to the second electronic module through the through connection element, the complicated steps in a conventional technique for connecting the electronic units and the lead wires to the second electronic module one by one can be simplified. Moreover, the assembling tolerance between the first electronic module and the second electronic module can be absorbed due to the flexibility of the flexible connection element of the through connection element. In addition, since the connectors of the first electronic module and the second electronic module all face to the same direction, and the second electronic module has the first opening exposing the first connector on the first electronic module, a visual blind spot of the user during the assembling can be avoided, so as to improve the accuracy and efficiency of assembling the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:

a first casing;

a second casing, having a second opening;

a first electronic module, disposed on the first casing, and located between the first casing and the second casing, the first electronic module comprising a plurality of electronic units and a first connector, wherein the electronic units are integrally connected to the first connector, and the first connector is protruded toward the second opening;

a second electronic module, disposed on the second casing, and located between the first casing and the second casing, the second electronic module comprising a motherboard and a second connector, wherein the second connector is electrically connected to the motherboard, and the second connector is protruded toward the second opening;

a through connection element, exposed by the second opening, and assembled between the first connector and the second connector from the second opening, the through connection element being electrically connected to the fist connector and the second connector for connecting the first electronic module to the second electronic module; and a cover, assembled to the second casing to cover the second opening.

2. The electronic device as claimed in claim 1, wherein the first electronic module further comprises a daughterboard and a plurality of lead wires, the daughterboard is electrically connected to the first connector, and the daughterboard is electrically connected to the electronic units through the lead wires.

3. The electronic device as claimed in claim 1, wherein the through connection element comprises a flexible connection element, a third connector and a fourth connector, the flexible connection element is electrically connected between the third connector and the fourth connector, and the third connector and the fourth connector are respectively assembled to the first connector and the second connector.

4. The electronic device as claimed in claim 3, wherein the first connector and the second connector respectively face to a first direction, and the third connector and the fourth connector are respectively assembled to the first connector and the second connector along a second direction, wherein the first direction is opposite to the second direction.

5. The electronic device as claimed in claim 4, wherein the motherboard has a first opening located on an assembling path of the first connector and the third connector.

6. The electronic device as claimed in claim 4, wherein the first connector and the third connector are located at a side of the motherboard.

* * * * *